K. KIEFER.
FILTER.
APPLICATION FILED FEB. 12, 1906. RENEWED JULY 13, 1911.

1,015,326.

Patented Jan. 23, 1912.

Witnesses.

Inventor.

K. KIEFER.
FILTER.
APPLICATION FILED FEB. 12, 1906. RENEWED JULY 13, 1911.

1,015,326.
Patented Jan. 23, 1912.
2 SHEETS—SHEET 2.

Witnesses.

Inventor.
Karl Kiefer

UNITED STATES PATENT OFFICE.

KARL KIEFER, OF CINCINNATI, OHIO.

FILTER.

1,015,326. Specification of Letters Patent. Patented Jan. 23, 1912.

Application filed February 12, 1906, Serial No. 300,765. Renewed July 13, 1911. Serial No. 638,397.

*To all whom it may concern:*

Be it known that I, KARL KIEFER, a citizen of the United States, and resident of Cincinnati, in the county of Hamilton and State of Ohio, have invented a new and useful Improvement in Filters, of which the following is a specification.

My invention relates to filters in which compressed fibrous pulp, usually in a moist condition, is employed as the filtering medium, called compressed pulp in the art.

The purpose of this invention is to simplify the construction of such filters, to facilitate their manufacture, to produce more efficient arrangement of its working parts and to cheapen the cost of the operation of such an apparatus.

The invention is illustrated in the accompanying drawing, of which—

Figure 1:
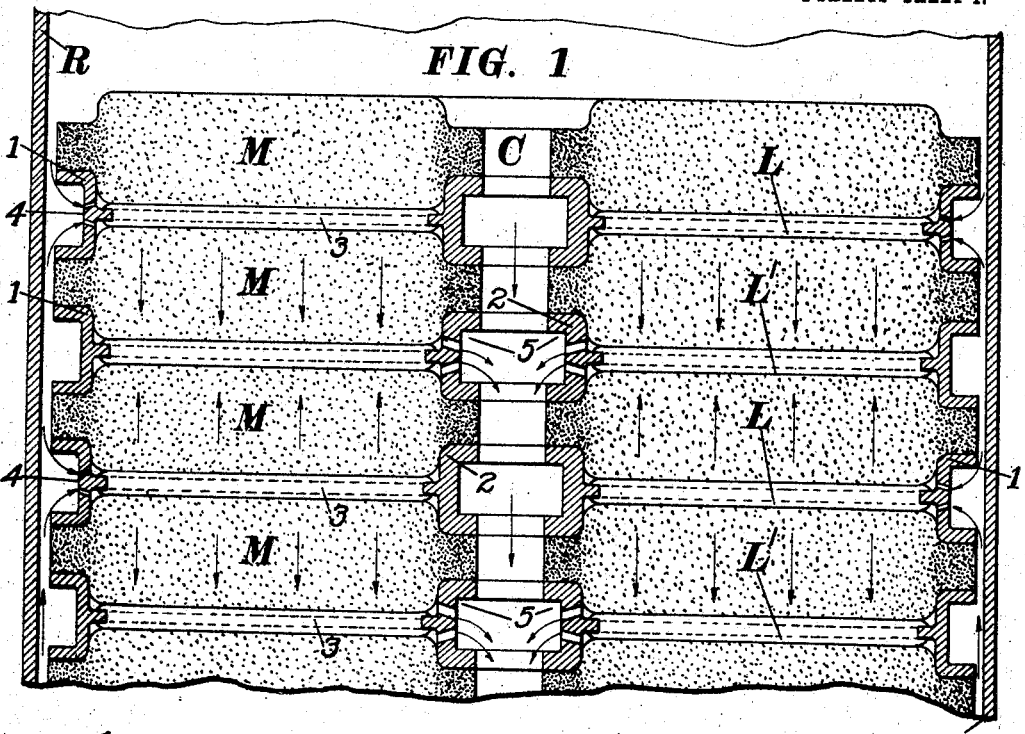
Figure 2:
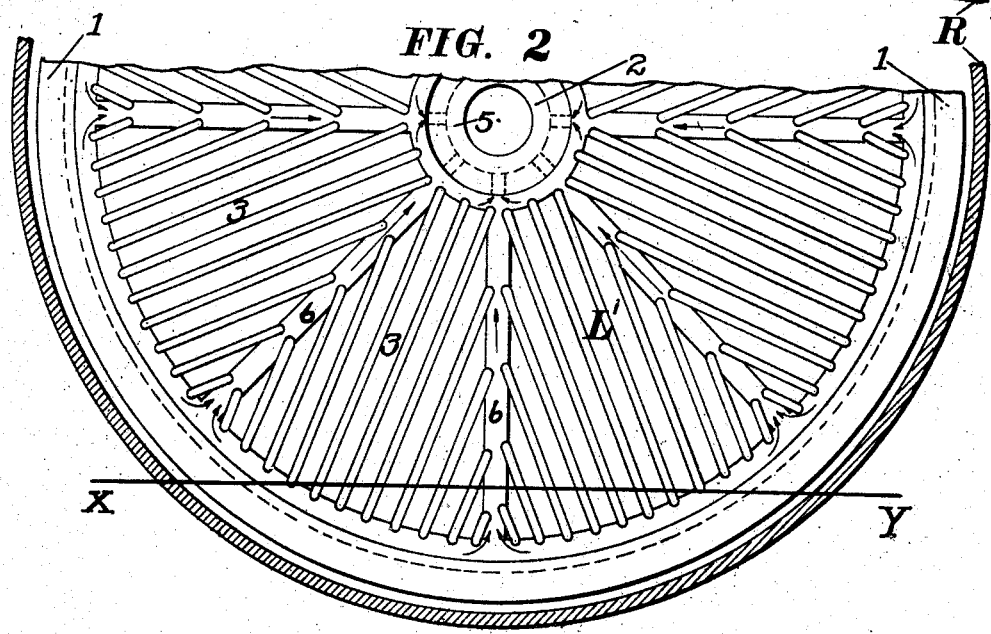
Figure 3:
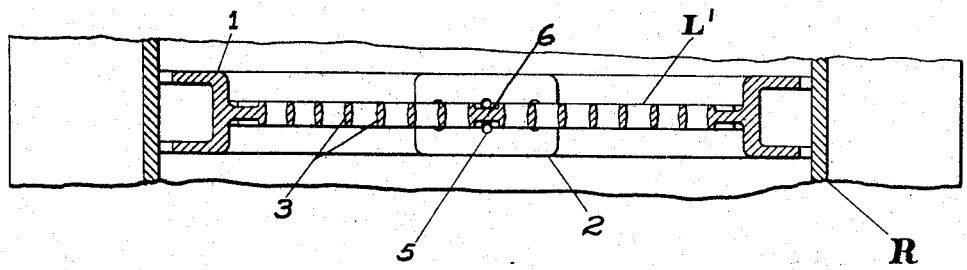

Figure 1 is a vertical cross section (taken on a line running radially from the center and parallel to strips 3), through several of the filter elements and the surrounding drum. Fig. 2 is a partial view of one of the liquid conductors, showing also part of the drum in cross section. Fig. 3 is a cross section through one of the liquid conductors and drum, taken on the line X—Y, Fig. 2.

"Liquid conductor" I call that flat structure parallel to the filter layer, which supplies or drains one or more of such filter layers, with cloudy or clear liquid respectively.

In Fig. 1, M is a filter layer, circular in form, with a central hole C; R shows part of the drum in cross section. This drum surrounds and incloses all the filter elements, and has a tight bottom and removable cover, such as known in the art. The liquid conductors L, L', between two filter layers, may be single castings or of other manufacture, and consist of a peripheral ring-shaped part 1, shown in Figs. 1, 2 and 3, of a central ring-shaped part 2, and a series of open, radial strips or bars 3 connecting both ring-shaped parts. These strips or bars connect with flat strips 6 of less depth. The flat strips 6 also connect peripheral rings 1 and central ring 2, such as is shown in cross section Fig. 3. The ring-shaped filter layer M is tightly compressed at its peripheral and central portions in such a manner that the same amount of mass is compressed to a less thickness, causing the filter layer to be dense and practically impervious at the compressed portions. These filter layers are produced in a packing press with ring-shaped protuberances, such as described in my Patent #779,122, Aug. 15th, 1905, reissued February 20th, 1906, #12,455. The ring-shaped parts 1 and 2 of the liquid conductors L and L' correspond with and press against the ring-shaped compressed parts of the two filter layers in contact therewith, and when the filter is closed, the compression should be strong enough to prevent any cloudy or clear liquid issuing between the compressed parts and the compression rings 1 and 2 of the liquid conductors L and L'.

In order to supply the filter layers M, alternate liquor conductors L have peripheral openings 4, communicating with the narrow space between the filter elements and the drum for the inlet of the liquid. These openings 4 connect with the open bars or strips 3 of the liquid conductors L and with the filter layers in contact. All the liquid conductors L' have the openings 5 on the central part for the outlet of the clear liquid of adjoining filter layers. Fig. 2 shows part of such an outlet liquid conductor in view. These filter liquid conductors may be lifted out of the drum and carried by the lifting instrument described in Patent #813,384, Feb. 20, 1906.

What I claim as my invention and desire to secure by Letters Patent is:

1. In a filter, the combination of an inclosing drum, a series of flat, disk-shaped filtering layers of compressed moist, fibrous pulp, each one previously compressed more at the periphery than at the remaining surface, of liquid conductors having compression elements to correspond with the depression in the filter layer.

2. In a filter, the combination of an inclosing drum, a series of flat, disk-shaped filter layers of compressed, moist, fibrous pulp, a series of inlet and outlet liquid conductors, each of said liquid conductors supporting a filtering layer and bearing upon one, said liquid conductors consisting of an open work part in contact with the filtering layers, and thicker parts in contact with the edges of said filter layers, said filter layers being previously compressed to substantially correspond with the outlines of the liquid conductor, and out of contact with it.

3. In a filter, the combination of an inclosing drum, a series of flat, disk-shaped filter layers of compressed, moist, fibrous pulp, a series of inlet and outlet liquid conductors, each of said liquid conductors supporting a filtering layer and bearing upon one, said liquid conductors consisting of an open work part in contact with the filtering layers, and thicker parts in contact with the edges of said filter layers, said filter layers being previously compressed and out of contact with the liquid conductor.

4. In a filter, the combination of an inclosing drum, a series of flat, disk-shaped filter layers of compressed, moist, fibrous pulp, a series of inlet and outlet liquid conductors, each liquid conductor supporting a filtering layer and bearing upon one, said liquid conductors consisting of an open-work part and a thicker part in contact with the edges of the filter layers.

5. In a filter, the combination of an inclosing drum, a series of flat, disk-shaped filter layers of compressed, moist fibrous pulp, a series of inlet and outlet liquid conductors consisting of a series of bars spaced apart so as to support the filter layers, and of a height to leave under compression a space sufficient for draining and supplying the liquid between said filter layers, and having thicker edges in contact with the edges of the filter pulp adapted to more compress them than the rest of the filter layer.

6. In a filter, the combination of an inclosing drum, a series of flat, disk-shaped filtering layers of compressed moist, fibrous pulp, with a series of inlet and outlet liquid conductors, consisting of open work bars and thicker marginal parts protruding equally on both sides over said bars and contacting with said filter layer, with means for supplying and draining the liquid conductors.

7. In a filter, the combination of an inclosing drum, a series of flat, disk-shaped filtering layers of compressed, moist fibrous pulp, a series of inlet liquid conductors supplying and supporting said filter layers, each consisting of a single part to be handled, said liquid conductor being thicker at the center and periphery, and being of open work manufacture in the ring-shaped space between said thicker parts.

8. In a filter, the combination of an inclosing drum, a series of flat, disk-shaped filtering layers of compressed, moist, fibrous pulp, an open work disk or plate of a single manufacture, a filter layer in contact with its upper face and supported by it, said filter layer more compressed peripherally and centrally.

9. In a filter, the combination of an inclosing drum, a series of flat, disk-shaped filtering layers of compressed, moist, fibrous pulp having peripheral depressions produced on both sides of the filter layer, with inlet and outlet liquid conductors.

10. In a filter, the combination of an inclosing drum, a series of flat, disk-shaped filter layers of compressed, moist, fibrous pulp in communication with a series of inlet liquid conductors and a series of outlet liquid conductors, both consisting of open work strips or bars, and surrounded peripherally by U-shaped compression rings, and having a central compression boss or hub, the inlet liquid conductors having openings within the U-shaped peripheral compression rings connecting them with strips or bars, the outlet liquid conductors having openings connecting said strips or bars with the central hole of the central boss or hub.

11. In a filter, the combination of an inclosing drum, a series of filter layers of compressed, moist, fibrous pulp, of a series of inlet liquid conductors and a series of outlet liquid conductors, both consisting of open work strips or bars, and surrounded peripherally by compression rings and having a central compression boss or hub, the inlet liquid conductors having openings within the peripheral compression rings connecting them there with strips or bars, the outlet liquid conductors having openings connecting said strips or bars with the central hole of the central boss or hub.

12. In a filter, the combination of an inclosing drum, a series of filter layers of compressed, moist, fibrous pulp in contact with a series of liquid conductors, consisting of an open work flat structure surrounded by U-shaped compression rings higher than said structure, and having a central compression boss also higher.

13. In a filter, the combination of a flat, disk-shaped filter layer of moist, fibrous pulp, and a plate having a thick outer marginal part and an interior part composed of discontinuous parts thinner than the marginal part and parts thinner than said discontinuous parts joining said discontinuous parts to each other and to the marginal part, whereby liquid conducting channels are formed on the interior of the plate, said filter layer being previously compressed extraneously of any filter structure with which it is in contact during filtration, with outer marginal part more highly compressed than its interior, to correspond with the thick outer marginal part of the plate.

14. In a filter, the combination of a flat disk-shaped filter layer of moist, fibrous pulp, and a plate having a thick outer marginal part and a thinner interior part having a series of intercommunicating channels, said filter layer being previously compressed extraneously of any filter structure with which it is in contact during filtration, with its outer marginal part more highly compressed than its interior, to correspond with the thick marginal part of the plate, and its interior less compressed part being supported across the channels of the interior part of the plate, leaving them open.

15. In a filter, the combination of a flat disk-shaped filter layer of moist, fibrous pulp, and a plate having a thick outer marginal part and a thinner interior part having an annular channel around inside the thick marginal part, and having transverse channels intercommunicating through said annular channel, said filter layer being previously compressed extraneously of any filter structure with which it is in contact during filtration, with its outer marginal part more highly compressed than its interior, to correspond with the thick marginal part of the plate, and its interior less compressed part being supported across said annular channel from the thicker marginal part to the thinner interior part, and across the transverse channels of the interior part, leaving said annular channel and said transverse channels open.

16. In a filter, the combination of a flat disk-shaped filter layer of moist, fibrous pulp, and a plate having a thick outer marginal part and a thinner interior part whereby an offset is formed around inside the thick marginal part, and the plate having an annular channel around inside said marginal part adjacent the offset, said filter layer being previously compressed extraneously of any filter structure with which it is in contact during filtration, with its outer marginal part more compressed than its interior, to correspond with the thick outer marginal part of the plate, with an offset to correspond with the offset of the plate, but being supported across said annular channel, leaving it open.

17. In a filter, the combination of a flat disk-shaped filter layer of moist, fibrous pulp, previously compressed extraneously of any filter structure with which it is in contact during filtration, with a more compressed gasket-forming part and a less compressed filtering part, and a plate having a thick part to engage with the gasket-forming part and a thin channeled part to engage with the filtering part of the layer, the channels of said thin part being intercommunicating and the filtering part of the layer being supported across said channels, leaving them open.

18. In a filter, the combination of a flat disk-shaped filter layer of moist, fibrous pulp, previously compressed extraneously of any filter structure with which it is in contact during filtration, with a more compressed gasket-forming outer marginal part and a more compressed gasket-forming central part surrounding a central opening therein, and having a less compressed filtering part lying between its outer marginal part and its central part, and a plate having a thick outer marginal part and a thick central hub, to correspond with the more compressed parts of the layer, and having a thinner channeled part to engage with the filtering part of the layer, the channels of said thin part being inter-communicating, and the filtering part of the layer being supported across said channels, leaving them open.

19. In a filter, a liquid conductor with intercommunicating channels, and a filter layer composed exclusively of moist, fibrous pulp, previously compressed extraneously of any filter structure with which it is in contact during filtration, with its fibers in direct contact with said liquid conductor.

20. In a filter, a liquid conductor having a thick outer marginal part and a thinner interior part with intercommunicating channels, and a filter layer composed exclusively of moist, fibrous pulp, previously compressed extraneously of any filter structure with which it is in contact during filtration, with its fibers in direct contact with said liquid conductor.

21. In a filter, a liquid conductor having a thick outer marginal part and a thinner transversely channeled interior part forming an offset with the thick marginal part, around inside said marginal part, and said plate having an annular channel around inside the thicker marginal part adjacent said offset, the transverse channels of said interior part being intercommunicating through said annular channel, and a filter layer composed exclusively of moist, fibrous pulp, previously compressed extraneously of any filter structure with which it is in contact during filtration, with its fibers in direct contact with said liquid conductor.

22. In a filter, a liquid conductor having a thick outer marginal part and a thinner transversely channeled interior part forming offsets with said thick marginal part around inside the marginal part on both sides of the plate, said plate having an annular channel around inside the thick marginal part adjacent each offset on each side of the plate, and the channels of the interior part being on both sides of the plate and being intercommunicating on their respective sides of the plate through said annular channels on the respective sides thereof, and filter layers, composed exclusively of moist, fibrous pulp, previously compressed extraneously of any filter structure with which they are in contact during filtration, with their fibers in direct contact with the sides of said liquid conductor.

23. As a new and improved article of manufacture, a flat disk-shaped filter layer of moist, fibrous pulp, compressed extraneously of the filter, with a more compressed outer marginal gasket-forming part and a less compressed interior filtering part, whereby it is self-supporting and independent of any supporting structure.

24. As a new and improved article of manufacture, a flat disk-shaped filter layer of moist, fibrous pulp, compressed extraneously of the filter, with its outer marginal part more compressed than its interior part, forming offsets on both its sides, around adjacent its outer edges, whereby it is self-supporting and independent of any supporting structure.

25. As a new and improved article of manufacture, a flat disk-shaped filter layer of moist, fibrous pulp, compressed extraneously of the filter, with a less compressed, easily disrupted interior filtering part, and a more compressed outer marginal part supporting the interior part against rupture, whereby said fibrous pulp layer may be handled, exteriorly of the filter, in its moist condition, independently of any supporting structure.

In testimony whereof I have signed my name to this specification in the presence of two subscribing witnesses

KARL KIEFER.

Witnesses:
G. W. WERDEN,
E. J. APPLETON.

---

Copies of this patent may be obtained for five cents each, by addressing the "Commissioner of Patents, Washington, D. C."